Figure 1:
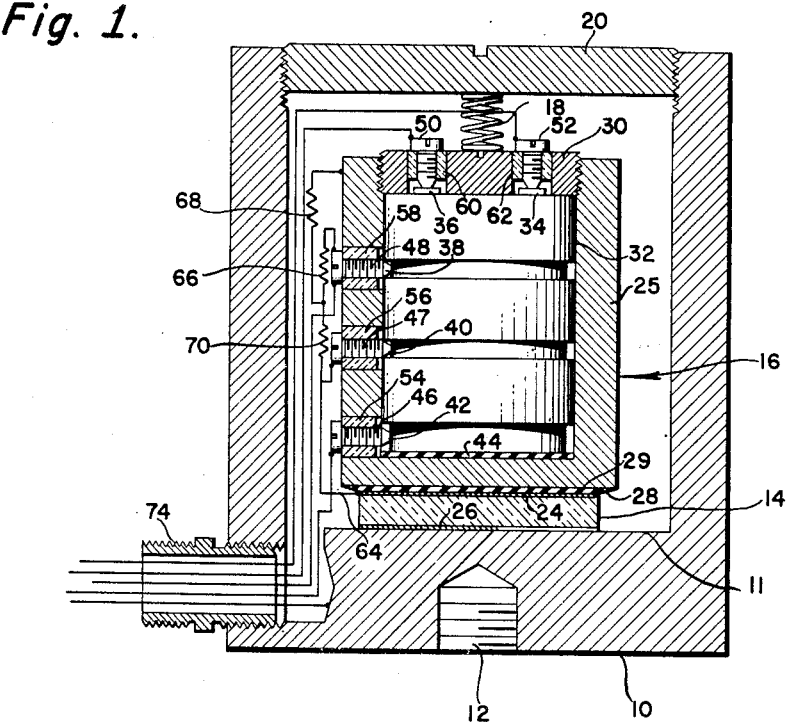

Feb. 18, 1958     H. I. SARGEANT     2,824,243
COMPRESSION TYPE ACCELEROMETER
Filed June 1, 1956

Homer I. Sargent,
*INVENTOR.*
BY.

*AGENT.*

United States Patent Office 2,824,243
Patented Feb. 18, 1958

2,824,243

COMPRESSION TYPE ACCELEROMETER

Homer I. Sargeant, Torrance, Calif., assignor to Hughes Aircraft Company, Culver City, Calif., a corporation of Delaware Application June 1, 1956, Serial No. 588,920

3 Claims. (Cl. 310—8.1)

This invention relates generally to accelerometers and more particularly to compression type accelerometers utilizing an inertial member for providing a weight or mass to vary the compression of a pressure sensitive element to produce an electrical output signal which varies with acceleration.

Conventional accelerometers of the compression type load a pressure sensitive element such as a piezo-electric crystal with a simple mass to produce an electrical impulse or output signal in response to the acceleration of a moving body. Since the crystal is a high impedance device, the output signal or voltage across it should not be attenuated at the low frequencies by placing a low impedance across the crystal. Accordingly, impedance transformers or signal amplifiers, such as cathode followers, are generally used to match the high impedance characteristics of the crystal to a low impedance input measuring instrument. In the instruments of known construction, a high impedance and low noise shielded cable is used to connect the output signal from the crystal to a remotely located impedance transformer and measuring instrument. This low noise cable reduces the sensitivity of the accelerometer and presents many other problems.

Under operating conditions, mechanical stresses are placed on the cable due to the acceleration of the accelerometer and cable. Such stresses cause mechanical deformation of the cable which changes its capacitance and distorts the output signal. Another problem that is frequently encountered in conventional accelerometers is the presence of error signals caused by ground loop currents. Such currents are conducted through the outside conductor or shield of the low noise cable due to differences in the ground potential between the measuring instrument and the apparatus to which the accelerometer is attached. To eliminate these ground loop currents which appear as error signals from the piezo-electric crystal the accelerometer must be electrically insulated from the apparatus to which it is attached. Such insulation is not always easy to achieve and in many cases may prohibit the most efficient use of an accelerometer. In addition to the above problems the low noise cable is the limiting factor in high temperature work. High temperatures cause physical deformation and deterioration, eventually causing failure of the cable. Attempted solutions of this high temperature problem have made use of liquid cooled housing for the accelerometer case and cable. Such housings and their associated heat transfer apparatus are expensive, bulky, and hard to use.

It is an object of this invention to provide an accelerometer which provides an output signal across a low impedance circuit thereby permitting the use of an external cable capable of surviving the environmental conditions under which the measurements are made.

Another object of this invention is to provide an improved miniature accelerometer for use under high temperature conditions which does not require the use of cooling apparatus.

In accordance with this invention, a compression type accelerometer is provided in which a signal amplifier is employed as part of an inertial member to vary the compression of a pressure sensitive element in response to acceleration and as an impedance transformer to reduce the impedance level of the output signal circuit from the pressure sensitive element.

Figure 2:
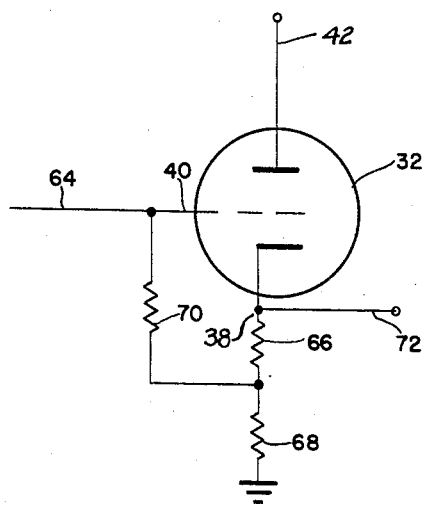

The novel features which are believed to be characteristic of the invention both as to its organization and method of operation together with the further objects and advantages thereof will be better understood from the following description considered in connection with the accompanying drawing in which:

Fig. 1 illustrates a sectional view of an accelerometer embodying the principles of this invention; and Fig. 2 is a schematic circuit diagram of a signal amplifier that may be used in the embodiment shown in Fig. 1.

Referring to Fig. 1, a housing 10 is provided with a rigid base member 11 and a hole 12, threaded over a portion of its length to permit the housing to be secured by means of a suitable bolt to a body whose acceleration it is desired to measure and to prevent bottoming of a straight threaded bolt. A pressure sensitive element 14 is secured to the base member by means of an inertial member 16, a spring member 18, and a top plate 20. The pressure sensitive element 14 may be any suitable electromechanical device which will generate a voltage in response to the compression thereof and which can be operated over the desired temperature range. Such a device may be a quartz crystal or suitable ceramic wafer of suitable configuration. Silver electrodes 24 and 26 are provided on each side of the pressure sensitive element to provide a low ohmic electrical connection and permit accurate measurement of the voltage across the element. A layer of electrical insulating material 28 is provided to insulate the electrode 24 from an end surface 29 of the inertial member. The inertial member acts as a mass or weight to vary the compression of the pressure sensitive element in response to the acceleration of the body to which the accelerometer is attached. The inertial member is provided with a suitable mechanical bias for maintaining the pressure sensitive element in compression. This bias is achieved by the spring 18 which is secured to the top plate 20 and a cap member 30. The top plate is threaded into housing 10 until spring 18 urges the inertial member towards the base plate 11 with sufficient force to prevent the greatest acceleration force to which the accelerometer is subjected from removing the surface 29 from contact with the pressure sensitive element. The inertial member consists of a signal amplifier 32, a suitable socket 25, and the removable cap member 30. The socket is a hollow nonmagnetic metal cylinder having a threaded top portion for engaging the cap member. The signal amplifier may be an electron discharge device such as type 6BY4, a microminiature ceramic triode having the characteristics of high gain, mechanical and electrical stability at elevated temperature and a high mechanical resonance frequency. Any signal amplifier may be employed that has sufficient gain, mechanical strength and temperature stability to operate satisfactorily under the conditions to which the accelerometer will be subjected. Such a signal amplifier should have a resonant frequency that is high compared with any of the frequencies at which accelerations are to be measured. If it is desired to decouple the mechanical resonance of the signal amplifier from the socket a layer of suitable damping material may be placed between the amplifier and the socket.

Electrodes 34 and 36 are connected to the filament of the triode. Electrodes 38, 40 and 42 provide electrical connection to the cathode, grid and plate, respectively. Insulating layer 44 is placed between the plate electrode and the bottom of the socket to insulate the plate electrode from the socket which is maintained at ground potential. Conductive bolts 46, 47, 48, 50 and 52 are threaded to engage insulating inserts 54, 56, 58, 60 and 62, respectively to provide electrical connections to the electrodes of the triode. The threaded inserts may be formed of ceramic material and secured to the metallic socket by suitable means such as bonding or otherwise.

In the circuit diagram of Fig. 2 the essential elements of the signal amplifier shown in Fig. 1 are indicated by like reference characters. In this diagram which illustrates a typical bootstrap cathode follower circuit, an electrical conductor 64 is provided to connect the output signal of the pressure sensitive element to the grid electrode 40 of the triode 32. Grid bias is achieved by a cathode resistor 66 which is connected in series with the cathode. The gain of the cathode follower may be increased by replacing such a cathode resistor with a suitable diode of the silicon junction type which is connected in series in the forward direction with the cathode. A load resistor 68 completes the cathode circuit to ground. A grid resistor 70 is connected between the grid electrode of the triode and the junction of the cathode and load resistors. Since the tube 6BY4 has a ceramic envelope which is divided into three sections by the electrodes 38 and 40, the grid, cathode, and load resistors may be printed on the ceramic sections of the tube envelope to provide a more compact unit. The signal output from the amplifier is measured between the cathode terminal 72 and the signal ground.

When the base member 11 is accelerated, the inertial member 16, which tends to remain at rest, transmits the accelerating forces through the pressure sensitive element 14 and changes the degree of compression of the element. Such a change in compression results in a corresponding change in the voltage or output signal that is generated between the electrodes 24 and 26. The signal amplifier provides an amplified replica of the generated signal across the low impedance output circuit. The impedance of the signal output circuit is thus reduced from that of the pressure sensitive element which is near infinity to several hundred ohms. Conventional equipment including connector 74 and a high temperature cable is used to supply power to the signal amplifier and measure the signal across the output circuit of the amplifier.

This invention is not limited to an accelerometer which employs an electron tube amplifier as the inertial member but includes the use of a transistor or other electrical signal amplifier as the inertial member.

In accordance with this invention there is provided a compression type accelerometer in which a signal amplifier varies the compression of a pressure sensitive element in response to acceleration and amplifies the output signal of the pressure sensitive element to provide a low impedance output circuit from the accelerometer.

What is claimed is:

1. An accelerometer of the type which produces a low impedance electrical output signal in response to acceleration, comprising in combination, a housing having a rigid base member, a pressure-sensitive element secured to said base member for producing an electrical output signal in response to a variation in compression, and a signal amplifier and socket adapted to compress said pressure-sensitive element against said base member and to provide a variation in the compression of said pressure-sensitive element in response to the acceleration of said base member, said amplifier having signal input and output circuits, said signal input circuit being connected to said pressure-sensitive elements for deriving an output signal therefrom.

2. An accelerometer as defined in claim 1 wherein said signal amplifier is an electron discharge device and said socket is comprised of a non-magnetic material.

3. An accelerometer of the type which produces a low impedance electrical output signal in response to acceleration comprising in combination: a housing having a compliant cylindrical sidewall portion and having a stiff base at one end thereof, the sidewall portion of said housing having a threaded inwardly extending flange at the opposite end thereof; a first stiff cap member threadably engaging said flange and rotatable relative thereto; a non-magnetic metallic socket having a stiff base at one end thereof and a compliant cylindrical sidewall portion, the sidewall portion of said socket having a threaded inwardly extending flange at the opposite end thereof; a second stiff cap member threadably engaging the flange of said socket and rotatable relative thereto; a signal amplifier including a plurality of electrodes secured within said socket, said socket including a plurality of conductive members passing therethrough and electrically insulated therefrom for making contact with said electrodes of said signal amplifier; a pressure sensitive element resting between the faces of the stiff base of said housing and the stiff base of said socket; and mechanical biasing means secured between said first and second cap members for urging said socket member toward the rigid base member of said housing to compress the pressure sensitive element therebetween, said pressure sensitive element being composed of material having an electrical characteristic that varies in accordance with the compression thereof, said amplifier having signal input and output circuits, and said signal input circuit being connected to said pressure sensitive element for deriving an output signal therefrom.

References Cited in the file of this patent

UNITED STATES PATENTS

| | | |
|---|---|---|
| 1,636,921 | Nicolson | July 26, 1927 |
| 1,919,480 | Rieber | July 25, 1933 |
| 2,714,672 | Wright et al. | Aug. 2, 1955 |